United States Patent [19]

Schmitt

[11] 3,946,880

[45] Mar. 30, 1976

[54] APPARATUS FOR DISASSEMBLING A LAYERED STACK OF ARTICLES

[75] Inventor: Robert A. Schmitt, Vancouver, Wash.

[73] Assignee: Columbia Machine, Inc., Vancouver, Wash.

[22] Filed: May 28, 1974

[21] Appl. No.: 473,344

[52] U.S. Cl.............................. 214/8.5 R; 214/1 Q
[51] Int. Cl.²......................................... B65G 59/06
[58] Field of Search... 214/1 Q, 1 QA, 8.5 R, 8.5 A, 214/8.5 D, 8.5 F, 6 P

[56] References Cited
UNITED STATES PATENTS

| 3,123,232 | 3/1964 | Postlewaite | 214/8.5 R X |
| 3,502,230 | 3/1970 | Grey et al. | 214/8.5 A X |

Primary Examiner—Frank E. Werner
Attorney, Agent, or Firm—Kolisch, Hartwell, Dickinson & Stuart

[57] ABSTRACT

Apparatus for receiving a stack of articles, such as rectangular cartons, disposed in a plurality of substantially horizontal layers and successively removing layers from the stack. The apparatus includes a bottom support onto which the stack may be conveyed, and an upright side support against which one side of the stack is supported. A top support is mounted on the side support in a position overlying the bottom support and is shiftable under power toward and away from the bottom support to clamp against the top of the stack. The bottom support, side support, and top support may be swung, concurrently, about a common, substantially horizontal axis 90° in the direction of the side support to lay the stack over on its side with the same being supported by the bottom, side and top supports. The bottom support then is swingable under power from this laid-over position to return to its substantially horizontal position to return the bottommost layer in the stack to its initial, substantially horizontal position, while remainder layers in the stack remain supported in their laid-over position by the side and top supports. A conveyor is operable to carry the removed layer from the receiving station, after which the bottom support is swung under power to its upright position again, the top support is shifted under power toward the bottom support to slide the stack toward the bottom support, and the bottom support again is returned to its horizontal position to remove the next layer from the stack.

16 Claims, 13 Drawing Figures

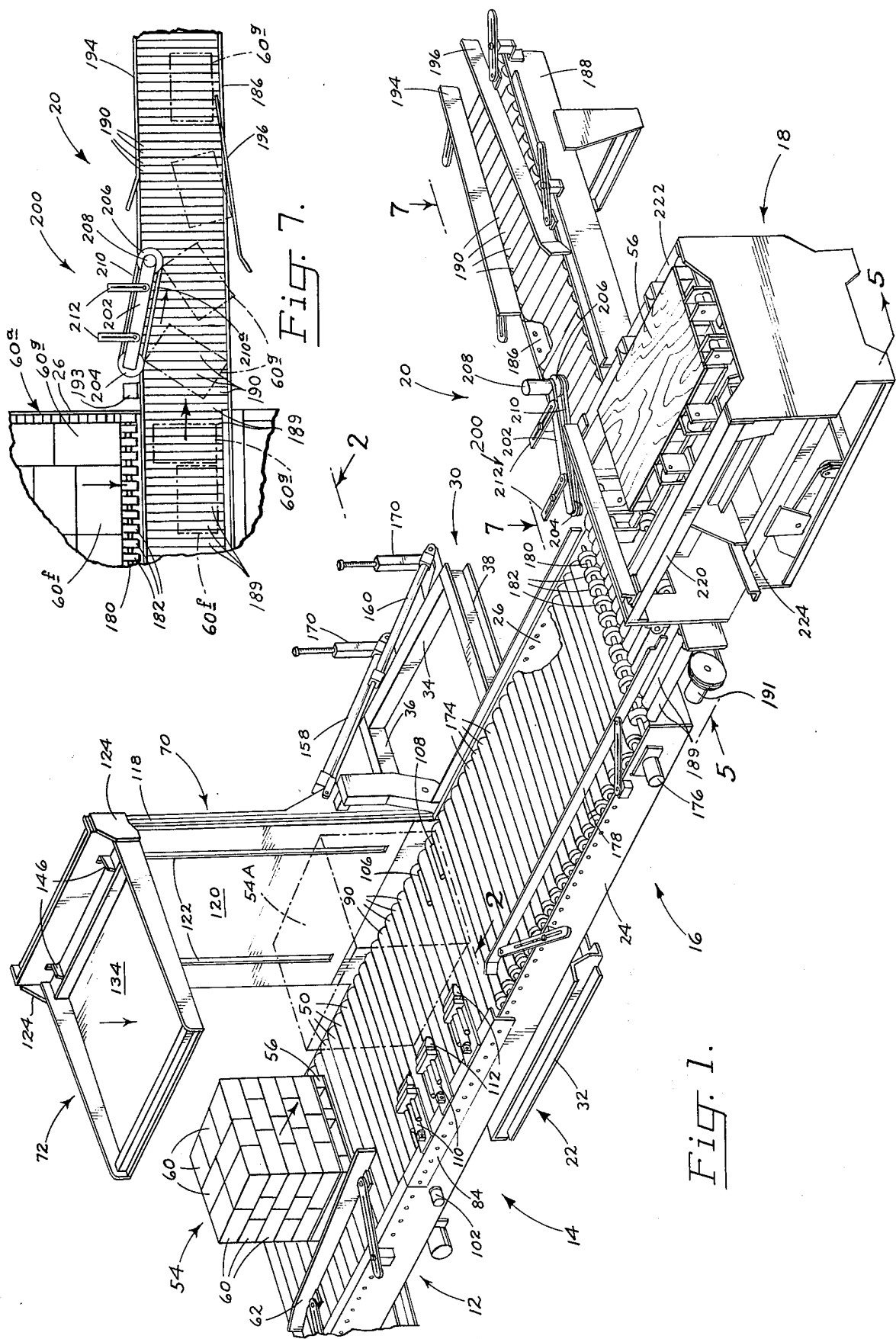

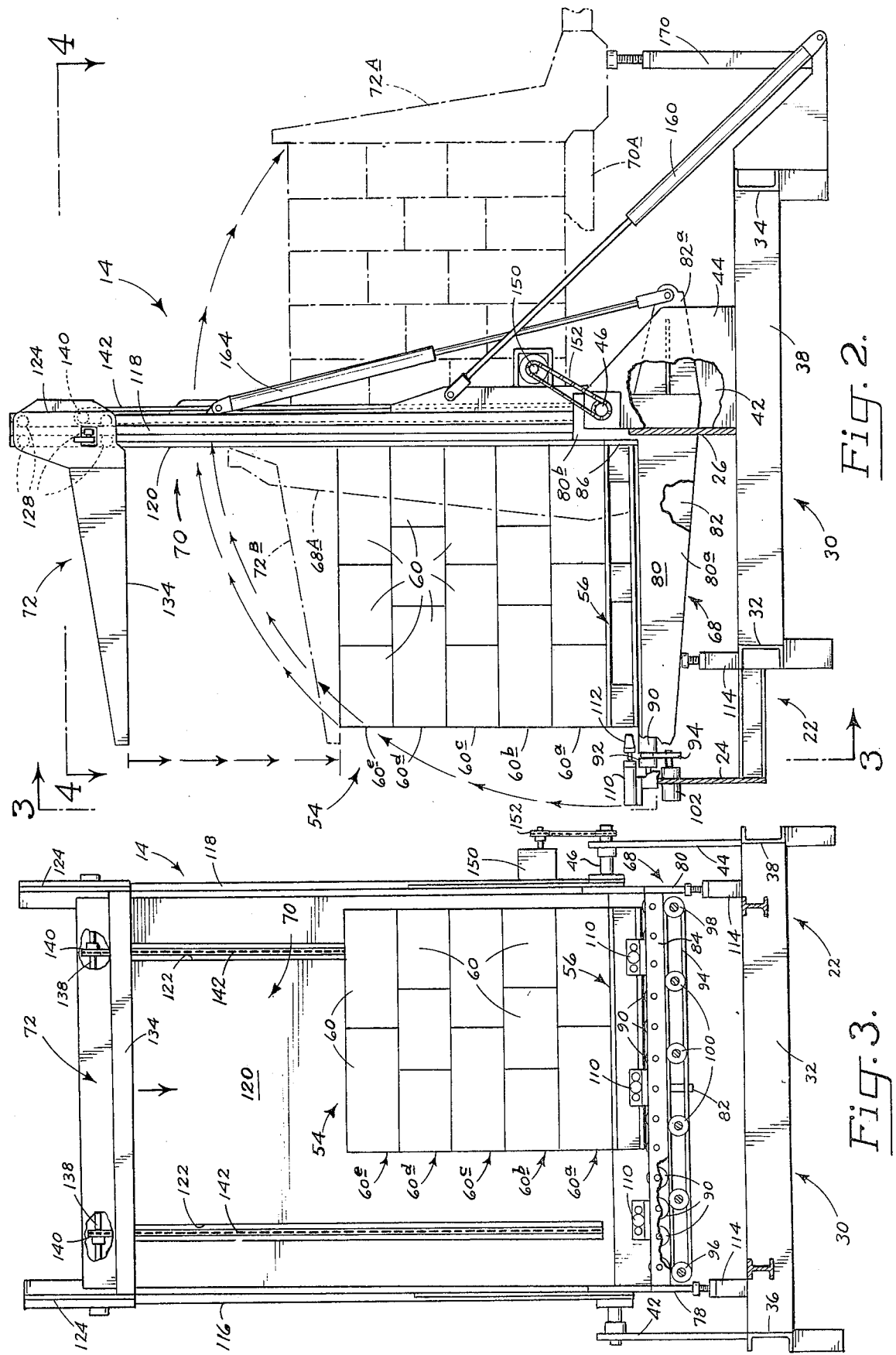

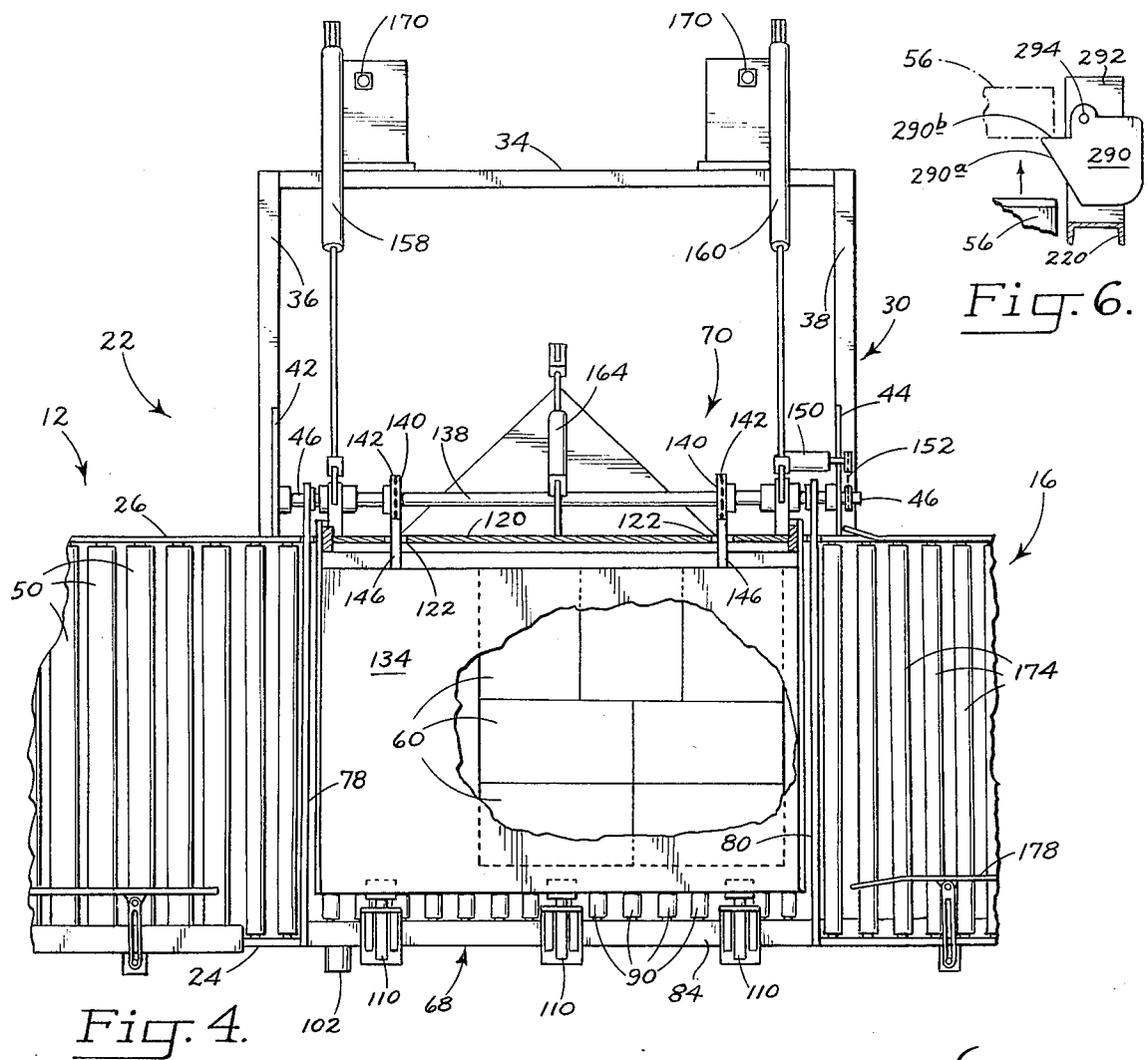
Fig. 4.
Fig. 6.
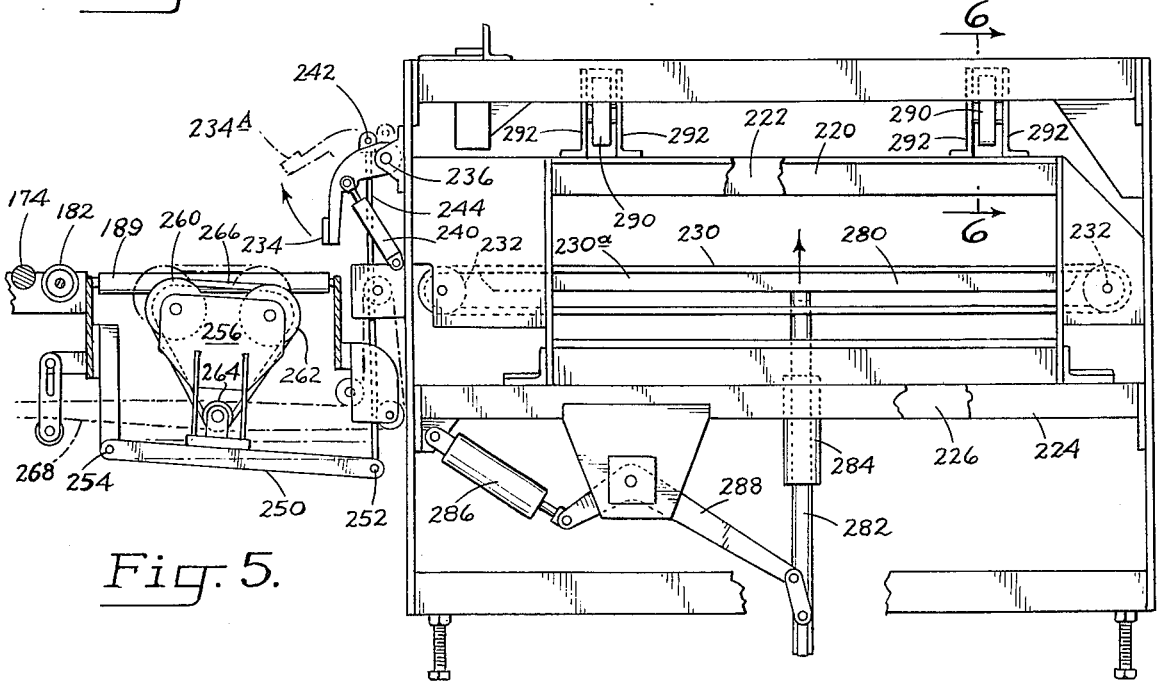
Fig. 5.

APPARATUS FOR DISASSEMBLING A LAYERED STACK OF ARTICLES

BACKGROUND AND SUMMARY OF THE INVENTION

This invention relates to apparatus and a method for removing successive layers of articles from a stack, and thereafter forming them into a row wherein each article in the row has a preselected orientation.

Various articles, such as cases, or cartons, of bottled or canned goods often are stacked in a plurality of vertically stacked, unconnected, substantially horizontal layers on a pallet, for transporting and handling. Various means and methods have been devised in the past in an attempt to provide efficient and safe means for unloading, or depalletizing, articles from such a stack. However, past devices, for the most part, have proved less than desirable, and for this reason hand labor is still the most used means for depalletizing a load.

A general object of the present invention is to provide novel apparatus for receiving a stack of articles disposed in vertically stacked, unconnected, substantially horizontal layers and successively removing layers from the stack.

Another object is to provide such novel apparatus in which the articles when removed from the stack, and carried away from the stack, are in substantially the same orientation they had on arriving at the unstacking apparatus, in that they are neither inverted, nor laid on their side when fully unloaded.

More specifically, an object of the present invention is to provide novel unstacking, or depalletizing, apparatus which includes a bottom support adapted to receive a stack of articles thereon, a side support operable to support an upright side of the stack, and means for laying the stack over in the direction of the side support with the side support and bottom support remaining in contact with their respective sides of the load, to support the load as it is laid over. The apparatus also includes means for then returning the bottom support to its substantially horizontal position to return the bottom layer of the stack to a horizontal position where it may be conveyed away, while remainder layers in the stack are held in their laid-over positions by the side support. With such apparatus, the articles are unstacked, or depalletized, in such a way that they are carried away from the stack in substantially the same orientation they had on arriving at the apparatus.

Yet another object is to provide such novel apparatus in which the bottom support is returned to an upright position after removal of the first layer, and which further comprises a top support operable to engage a top side of the stack of articles, and slide it along the side support toward the bottom support to facilitate removal of the next layer in the stack. In this way, successive layers of the stack may be removed.

A still further object of the invention is to provide such novel apparatus which, after removing a layer of articles from a stack, is operable to rearrange the articles from a layer into an elongate row, and carry such row away from the unstacking apparatus.

Where rectangular articles, such as elongate cartons, are carried on a pallet in a plurality of layers, they often are disposed in their individual layers with various ones of the cartons extending substantially normal to other cartons in the layer. With such angular orientation of articles in one layer, and a different angular orientation between articles in overlying and underlying layers in the stack, a somewhat keyed together condition is provided in the stack to provide a more stable load and to prevent the stacked articles from toppling from the pallet.

A still further object of the present invention is to provide novel apparatus which is operable to receive a layer of articles in which certain articles in the layer are in angularly disposed relationships to other articles in the layer, form the articles into an elongate row with various ones of the articles having their lengths extending transversely of the row, carrying the row along a path extending longitudinally of the row, and turning such transverse articles to a position in which their lengths extend longitudinally of the row. With such apparatus, all of the articles from a layer may be disposed with their lengths extending longitudinally of the row.

Another object of the present invention is to provide a novel method for removing articles from a layered stack including the steps of receiving the stack at a receiving station, laying the stack of articles over on its side, and thereafter removing successively from the bottom of the stack layers of such articles and conveying them away from the receivng station.

DRAWINGS

These and other objects and advantages will become more fully apparent as the following description is read in conjunction with the drawings, wherein:

FIG. 1 is a perspective view of apparatus constructed according to an embodiment of the invention;

FIG. 2 is an enlarged view of a portion of the apparatus taken generally along the line 2—2 in FIG. 1;

FIG. 3 is a view taken generally along the line 3—3 in FIG. 2;

FIG. 4 is a top plan view taken generally along the line 4—4 in FIG. 2;

FIG. 5 is an enlarged view of a pallet magazine in the apparatus taken generally along the line 5—5 in FIG. 1;

FIG. 6 is a view of a pallet holding member in the pallet magazine taken generally along the line 6—6 in FIG. 5;

FIG. 7 is a top plan view of article orienting apparatus taken generally along the line 7—7 in FIG. 1.

DETAIL DESCRIPTION OF AN EMBODIMENT OF THE INVENTION

Figure 8:
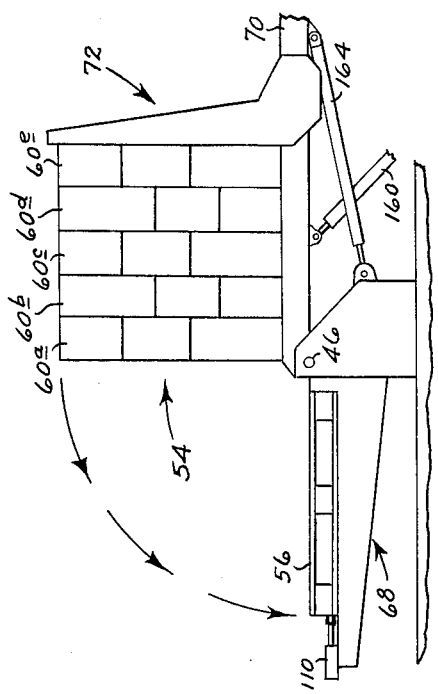
FIGS. 8—13 are views taken generally along the line 2—2 in FIG. 1, illustrating sequentially the pattern of operation of a portion of the apparatus of the invention.

Referring to the drawings, and first more specifically to FIG. 1, at 10 is indicated generally apparatus constructed according to an embodiment of the invention. The apparatus includes generally an infeed conveyor section 12, a tilt frame depalletizer section 14, an outfeed conveyor section 16, a pallet receiving and storage magazine 18, and an article orienting section 20.

Infeed conveyor 12, tilt frame depalletizer 14, and outfeed conveyor 16 are all mounted on a common mounting frame indicated generally at 22. Mounting frame 22 includes a pair of laterally spaced, parallel, elongate side plates 24, 26 which are supported intermediate their opposite sets of ends on a base frame 30.

Referring to FIGS. 1—4, base frame 30 includes a pair of elongate, horizontal, laterally spaced end beams 32, 34 paralleling side plates 24, 26. End beam 32 is disposed beneath and intermediate side plates 24, 26 and end beam 34 is spaced laterally outwardly a distance from side plate 26, as is best seen in FIGS. 1, 2 and 4. Elongate, laterally spaced, substantially horizontal side beams 36, 38 extend between and are secured, as by welding, to opposite sets of ends of end beams 32, 34 to form a substantially rectangular base frame.

A pair of laterally spaced, substantially parallel, support plates 42, 44 (see FIGS. 2, 3 and 4) are secured, as by welding, to side beams 36, 38, respectively, and project upwardly therefrom adjacent side plate 26.

An elongate, substantially horizontal, shaft 46 extending substantially parallel to side plate 26 is jouraled for rotation adjacent its opposite ends in upper portions of plates 42, 44.

Infeed conveyor section 12 includes a plurality of elongate, parallel, substantially horizontal rollers 50 journaled adjacent their opposite sets of ends in side plates 24, 26. The upper surfaces of rollers 50 lie in a common horizontal plane. Rollers 50 are connected to powered drive means, whereby they may be rotated under power to carry a load, such as that indicated generally at 54 in FIG. 1 toward depalletizer section 14.

As is illustrated in FIGS. 1—3, load 54 may be a palletized stack of cartons or other articles. Explaining further, a pallet 56 supports a plurality of cartons, or other articles thereon. In the illustrated load, a plurality of rectangular cartons 60 having lengths greater than their widths, such as would be used for carrying bottled or canned goods, are stacked in a plurality of vertically stacked, unconnected substantially horizontal layers, indicated geneerally at 60a, b, c, d, e, with layer 60a being the bottom layer in the stack. In each layer, certain of the cartons may be oriented with their lengths extending normal to other cartons in the layer. Further, various cartons in overlying and underlying layers are disposed normal to each other to form a stack in which the cartons in the various layers aare somewhat keyed together to produce greater stability and resistance to separation in the stack.

An elongate guide, or positioning, member 62 is disposed adjacent the set of ends of rollers 50 nearest side plate 24. Member 62 is adjustable to desired positions to urge a load, such as that indicated generally at 54, in the direction of side plate 26 to a desired position on the infeed conveyor section.

Describing tilt frame depalletizer section 14 in greater detail, it includes generally a bottom support 68, an upright side support 70, and a top support 72.

Describing bottom support 68 in detail, it includes a pair of laterally spaced, parallel, elongate side support plates 78, 80 (see FIGS. 2, 3 and 4) which extend transversely between side plates 24, 26 of the mounting frame. Each of support plate 78, 80 has the configuration illustrated in FIG. 2 for plate 80, with an elongate leg 80a and a shorter leg 80b projecting normally outwardly therefrom. Each of side support plates 78, 80 is journaled in the region of its shorter leg portion on shaft 46 for rotation freely thereabout.

Disposed intermediate side support plates 78, 80 is an intermediate support plate 82 which has generally the side view configuration of that illustrated for side support plate 80, but which also has a rearwardly projecting leg portion 82a (see FIG. 2) which projects outwardly therefrom on the opposite side of shaft 46. Intermediate support 82 similarly is journaled for rotation freely on shaft 46.

An elongate, substantially horizontally disposed angle member 84 is secured to and extends transversely of the outer set of ends of support plates 78, 80, 82 adjacent side plate 24 of the mounting frame. An elongate, upright plate 86 extends in the direction of and adjacent side plate 26 of the mounting frame and is secured to the shorter leg portions of support plates 78, 80 and 82.

A plurality of elongate, parallel, laterally spaced, rollers 90 extend transversely between and are journaled adjacent their opposite sets of ends on angle member 84 and plate 86. As is best seen in FIGS. 2 and 3, the tops of rollers 90 are disposed in a substantially common plane above the elongate legs of support plates 78, 80 and 82, while plate 86 projects a distance above the tops of rollers 90 to form a lip projecting above the rollers. Plate 86 projects above rollers 90 a distance slightly less than the height of the shortest layer in load 54, whether that be pallet 56 or one of the layers of cartons 60. In the embodiment illustrated, pallet 56 has the smallest vertical dimension, and thus lip 86 extends above rollers 90 a distance slightly less than the height of pallet 56.

With the construction of bottom support 68 as thus far described, it is mounted for swinging about shaft 46 between a generally horizontal, or first, position (as illustrated in FIGS. 1, 2, 3 and 4) in the direction of arrows shown in FIG. 2 to a substantially upright, or second, position.

As is seen in FIG. 2, each of rollers 90 has an annular groove 92 formed therein adjacent its end journaled on angle member 84. Referring to FIG. 3, a pair of laterally spaced pulleys 96, 98 journaled on side plate 24 of the mounting frame, and a plurality of support pulleys 100 interposed therebetween, support an elongate, endless, flexible V-belt 94 with an upper horizontally disposed elongate reach adjacent the grooved ends of the rollers. The V-belt is in a position to fit within grooves 92 in rollers 90 when bottom support 68 is in its first position, as illustrated in the figures. Should the bottom support be swung upwardly from the position illustrated, rollers 90 are moved out of contact with V-belt 94. A hydraulic motor 102 is operatively connected to pulley 96 for driving belt 94 to rotate rollers 90 when the support frame is lowered to produce movement of a load supported on rollers 90.

A pair of laterally spaced control rollers 106, 108 (see FIG. 1) are interposed between spaced sets of rollers 90 adjacent what may be considered the downstream end of the tilt frame depalletizer. Rollers 106, 108 are spring biased upwardly into a normally raised position with their upper surfaces above rollers 90. A load, such as that indicated generally at 54, carried on rollers 50 and rollers 90 of the infeed conveyor and tilt frame depalletizer sections respectively, will be carried into positions over rollers 106 and 108 to depress the same. Rollers 106, 108 are operatively connected to control mechanism for motor 102 whereby when a load depresses roller 106, it shuts off a portion of the supply of the operating fluid flowing to motor 102 to slow the rotation of rollers 90, and upon the load reaching roller 108 and depressing the same, control mechanism interconnecting it and the supply of pressure fluid to motor 102 stops the motor to stop the load in a desired position on the depalletizer. A load stopped in the desired position is illustrated in dot-dash phantom outline at 54A in FIG. 1 and in solid outline in FIGS. 2, 3 and 4.

Mounted on angle member 84 and extending over the outer sets of ends of rollers 90 in the direction of plate 86 are three hydraulic rams 110. Attached to the rod end of each of rams 110 is a gripping member 112 which is shiftable toward and away from plate 86 in a plane overlying rollers 90.

Referring to FIGS. 2 and 3, mounted on and projecting upwardly from end beam 32 of the mounting frame are a pair of laterally spaced, upright, screw-adjustable support devices 114. Each of devices 114 underlies a side support plate 78, 80 of the bottom support and is adapted to provide support for the bottom support when it is in its first position illustrated in FIGS. 2 and 3.

Describing side support 70, it includes a pair of laterally spaced, parallel, elongate columns 116, 118 which are journaled at their lower set of ends for rotation freely on shaft 46. A substantially rectangular side support plate 120 is secured to what may be considered the inwardly facing set of edges of columns 116, 118. The lower edge of plate 120 overlies and is contiguous the upper edge of plate 86 on the bottom support when the two sections aare in the positions shown in FIGS. 1, 2 and 3. A pair of elongate, laterally spaced slots 122 in side support plate 120 extend parallel to columns 116, 118.

Describing top support 72, it includes a pair of laterally spaced, elongate side plates 124 having rollers, such as those indicated generally at 128 (FIG. 2) journaled thereon for engaging and rolling longitudinally along columns 116, 118. A substantially rectangular top support plate, or clamping member, 134 is supported on plates 124 in a position cantilevered substantially normally outwardly from side support plate 120 and overlying rollers 90 of the bottom support. Top support plate 134 thus is mounted, through rollers 128, for movement along columns 116, 118 toward and away from rollers 90 with plate 134 maintained substantially normal to side support plate 120 throughout such movement.

Referring to FIGS. 2, 3 and 4, an elongate substantially horizontal shaft 138 extends transversely of the tops of columns 116, 118 and is journaled for rotation thereon. A pair of laterally spaced sprockets 140 are secured to shaft 138 substantially in line with slots 122. A similar set of sprockets are secured to shaft 46 adjacent the bottom of columns 116, 118, also substantially in line with slots 122. A pair of elongate, endless, chains 142 are trained over sprockets 140 on shaft 138 and their corresponding sprockets on shaft 46. A pair of lugs 146 secured to top support plate 134 extend through slots 122 and are connected to chains 142.

A reversible motor 150, operatively connected to shaft 46 through a combination of sprockets and a drive chain 152 is operable, to rotate shaft 46 to produce movement of chains 142, thus to move top plate 134 as desired longitudinally along columns 116, 118.

A pair of elongate, extensible-contractible rams 158, 160 are operatively connected at one set of their ends to base frame 30 adjacent end beam 34 and adjacent their opposite set of ends to intermediate regions of columns 116, 118 on side support 70. With rams 158, 160 extended, as illustrated, side support 70 and top support 72 are in their first positions illustrated in solid outline in FIG. 2, with side support plate 120 substantially upright, and top support plate 134 substantially horizontal and overlying rollers 90. Retraction of rams 158, 160 serves to swing side support 70 and top support 72 concurrently about shaft 46 to lay them over in the direction of the arrows in FIG. 2 to the laid-over position shown in dot-dash outline at 70A, 72A.

An elongate, extensible-contractible ram 164 is connected adjacent one of its ends to leg portion 82a of the intermediate support member 82 for the bottom support and at its other end to an upper section of side support 70. With ram 164 extended as illustrated, and held in this position, bottom support 68 will be maintained substantially normal to side support 70. This allows it to be swung with side support 70 and top support 72 about shaft 46 on retraction of rams 158, 160, whereby when the side support is swung to its laid-over, substantially horizontal, second position as illustrated at 70A, bottom support 68 projects upwardly therefrom to the position shown in dot-dash outline in FIG. 2 at 68A. Retraction of ram 164 then swings bottom support 68, independently of side support 70 and top support 72, back toward its first position illustrated in solid outline in FIG. 2.

A pair of screw-adjustable support devices 170 are positioned to provide support for side support 70 and top support 72 when they are swung to their laid-over position illustrated in dot-dash outline in FIG. 2.

Outfeed conveyor section 16 includes a plurality of elongate, parallel, laterally spaced, substantially horizontal rollers 174 which are journaled adjacent their opposite sets of ends in side plates 24, 26. A motor 176 is operable to drive rollers 174, whereby a load supported thereon is conveyed in a downstream direction, away from tilt frame depalletizer section 14. an elongate guide plate 178 extending along one side of the outfeed conveyor section is operable to guide a load as it is carried along rollers 174.

The operation of the apparatus thus far described is as follows. A load 54 is carried by infeed conveyor section 12 onto depalletizer section 14. As the load is moved toward the depalletizer section, it is urged by guide plate 62 into a position where its upright side facing side support 70 will be contiguous side support plate 120. Operation of motor 102 connected to V-belt 94 serves to rotate rollers 90 whereby they carry load 54 in a downstream direction thereover. As the load arrives at and depresses control roller 106 it slows motor 102 to slow movement of the load along rollers 90. As the load reaches and depresses control roller 108, this stops motor 102 to stop rollers 90 and load 54 in the position shown in FIGS. 2, 3, 4 and 8, and as shown in phantom outline at 54a in FIG. 1. Motor 150 then is operated to move top support plate 134 to the position shown in dot-dash outline at 72B in FIG. 2, clamped against the top of load 54.

Figure 9:
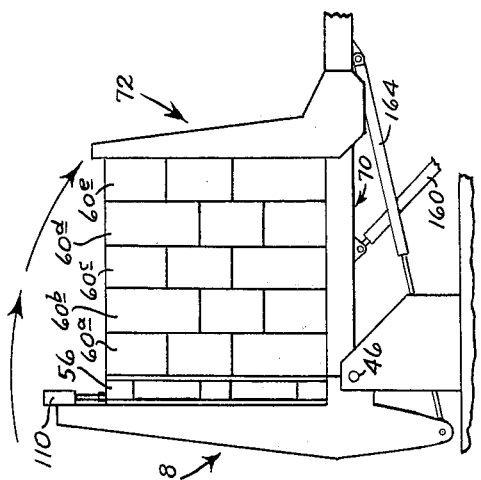

Rams 158, 160 then are contracted to swing bottom support 68, side support 70 and top support 72 about shaft 46 to the laid-over positions shown at 68A, 70A and 72A in FIG. 2 and as shown in solid outline in FIG. 9. The load thus is held and swung from a position in which its layers are disposed horizontally (as shown in FIGS. 1, 2, 3 and 8) to a laid-over position in which the layers extend substantially vertically (as shown in phantom outline in FIG. 2 and as shown in solid outline in FIG. 9). In this position, the load is supported on one of its sides on side support plate 120, while bottom support 68 and top support 72 support opposite, upright ends of the load.

Figure 11:
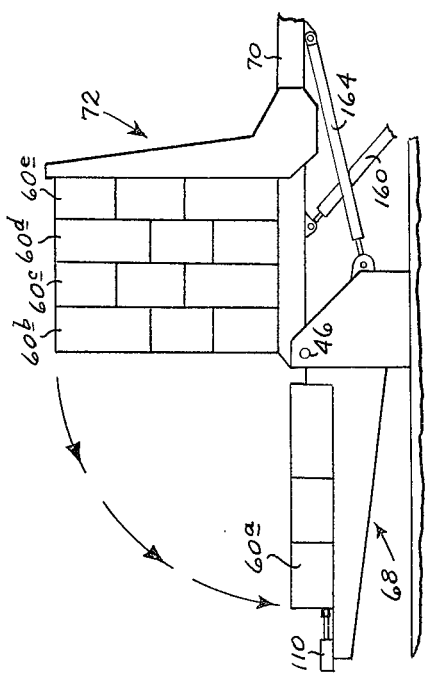
Figure 12:
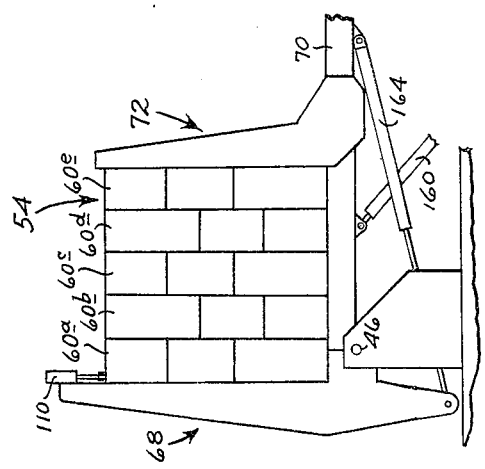
Figure 13:
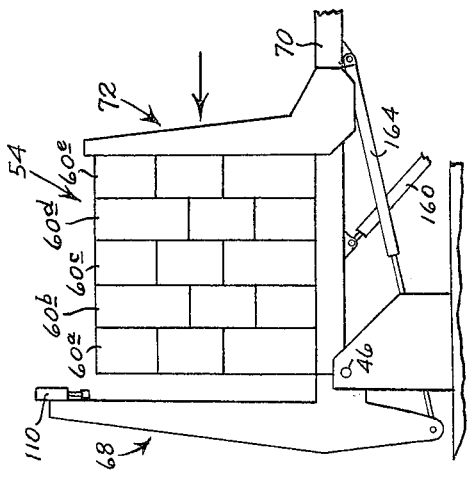

Gripping rams 110 then are extended to clamp pallet 56 against side plate 86 on the bottom support. Ram 164 is contracted to swing bottom support 68 back to its horizontally disposed position (as illustrated in solid outline in FIGS. 1, 2, 3 and 10) independently of side support 70 and top support 72. This results in returning of pallet 56 to a horizontal position. Operation of motor 102 then actuates rollers 90 to carry the pallet away from the depalletizer and onto outfeed conveyor section 16. After the pallet is conveyed away, bottom support 68 is returned to its upright position by extension of ram 164, as illustrated in FIG. 11. Motor 150 is operated to shift top support 72 and load 54 supported on side plate 70 toward bottom support 68 until the bottommost layer 60a is clamped against bottom support 68. Gripping rams 110 then again are extended to grip the articles in layer 60a, and ram 164 again is retracted to return bottom support 68 to its horizontal position (as shown in FIG. 13) with layer 60a of cartons returning to the horizontal position therewith. Motor 102 then is operated again to convey layer 60a in a downstram direction onto outfeed conveyor 16, and bottom support 68 is swung again to the upright position shown in FIG. 11 and the sequence just described from FIGS. 11 through 13 is repeated to successively remove individual layers of articles from the stack until the stack is completely separated.

Referring to FIGS. 1 and 7, extending transversely between the downstream set of ends of side plates 24, 26 is an elongate shaft 180 on which are secured a plurality of rubber rollers 182. Shaft 180 is connected to rotating means operable to rotate the same independently of and at a faster speed than rollers 174. Rollers 174 and shaft 180 both are rotatable under power intermittently and independently of each other.

Referring still to FIGS. 1 and 7, article orienting section 20 includes a pair of elongate, laterally spaced side plates 186, 188 extending normal to side plates 24, 26. A plurality of elongate, substantially horizontal, laterally spaced power-driven rollers 189 extend between and are journaled at opposite sets of their ends in side plates 186, 188 adjacent the downstream end of outfeed conveyor 16. Another set of elongate, substantially horizontal, laterally spaced, power-driven rollers 190 extend between and are journaled at opposite sets of their ends in side plates 186, 188 laterally of side plate 26 of outfeed conveyor section 16 as is best seen in FIG. 7, in what may be considered a downstream direction from rollers 189.

Referring to FIG. 1, a motor 191 is operatively connected to rollers 189 for producing powered turning of rollers 189. Referring to FIG. 7, a motor 193 is operatively connected to rollers 190 for producing powered turning of rollers 190 at a speed faster than the turning of rollers 189. Rollers 189, 190 together form a powered article conveyor which extends normal to outfeed conveyor 16.

A pair of elongate, laterally spaced, aligning plates 194, 196 are mounted adjacent opposite sets of ends of rollers 190 and project upwardly therefrom. Plates 194, 196 are mounted for adjustment toward and away from each other to selected positions for guiding articles of various sizes.

Disposed adjacent one set of ends of rollers 190, intermediate outfeed conveyor section 16 and aligning plates 194, 196, is an article turning device indicated generally at 200. Device 200 includes an elongate substantially horizontal bar 202 at opposite ends of which pulleys 204, 206 are journaled for rotation about substantially vertical axes.

An elongate, endless, flexible friction belt 210 is trained about pulleys 204, 206. This produces an elongate, substantially horizontal reach 210a for the belt. Bar 202 is mounted on side plate 186 through adjustment devices 212 which permit positioning reach 210a as desired relative to rollers 190. In the illustrated embodiment, reach 210a is illustrated extending at an angle to the path along which articles may be conveyed along rollers 190, and thus toward the longitudinal center line of the row of rollers 190. A motor 208 operatively connected to pulley 206 is operable to drive the pulleys and belt 210 in such a manner that reach 210a of the belt travels at a substantially faster speed than an article will be carried on rollers 190.

Outfeed conveyor 16 and article orienting section 20 are operable to remove articles from a layer conveyed onto the outfeed conveyor section, and to form thm into an elongate row wherein all of the articles have like orientation in the row. Explaining further, a portion of layer 60a of the load removed from the stack is illustrated at the downstream end of outfeed conveyor 16 in FIG. 7. As such a layer is moved to a position in which the leading group of cartons, or articles, are resting on rollers 182 conventional control apparatus in the apparatus is operable to stop the layer at this point. Shaft 180 then is rotated independently of rollers 174 to carry the forwardmost, or leading, row of articles onto rollers 189 of section 20. Two of such cartons are illustrated at 60f and 60g, respectively, in phantom outline.

As will be noted, the lengthwise dimension of carton 60f is disposed normal to the axes of rollers 189, 190, while the lengthwise direction of carton 60g is disposed parallel to rollers 189, 190. The article orienting section of the apparatus is set up to orient all of the articles removed from the stack with their lengthwise directions extending normal to rollers 189, 190, as illustrated for article 60f.

When a row of articles, or cartons, are moved by rollers 182 onto rollers 189, powered rotation of rollers 189 initiates movement of the carton to the right in FIG. 7, in the direction of the arrow. As the lead carton in the row, herein indicated as 60g, reaches rollers 190 which are being rotated faster than rollers 189, the lead carton is accelerated to separate it from the following cartons in the row. Subsequent cartons moving from rollers 189 onto faster rollers 190 also will be spaced from following cartons, thus to provide sufficient room between cartons on rollers 190 to allow turning as required.

As article 60g is conveyed to the right in FIG. 7, over rollers 190, turning device 200 is operable to turn it to a position as illustrated for carton 60f. Explaining further, as article 60g is carried in a downstream direction along rollers 190 at a preselected speed, its side nearest article turning device 200 comes into contact with reach 210a of belt 210. Since belt 210 is moving at a faster speed than rollers 190 are carrying the carton, the carton is rotated about an upright axis, as illustrated in the sequential views of FIG. 7, to reorient the carton to a position similar to the position of carton 60f. As carton 60f is carried therethrough the positioning of belt 210 is such that carton 60f will not be turned.

After the cartons in the first, or lead, row from layer 60a have been moved past article-turning device 200, the next row in the layer is moved by rollers 174, 182 onto rollers 189, 190 and the same are carried along rollers 190 to the right in FIG. 7, with cartons oriented as illustrated for carton 60g being turned 90° to the orientation illustrated for carton 60f. In this way, a layer may be removed from a load, disassembled, and the articles then formed into a row with the articles in the row all oriented in a common direction.

Referring to FIGS. 1 and 5, pallet storage magazine 18 and means for diverting pallets thereto will now be described. Storage magazine 18 includes a main frame having a pair of laterally spaced, parallel, substantially horizontal upper support beams 220, 222 and a pair of laterally spaced lower support beams such as that indicated generally at 224, 226, A pair of laterally spaced, elongate, endless support belts, such as that indicated generally at 230, are trained over pulleys 232 adjacent opposite ends of the magazine frame to provide substantially horizontal upper reaches 230a for the belts. Upper reaches 230a of the belts lie in a substantially common horizontal plane with the upper surfaces of rollers 174, 182 of outfeed conveyor section 16, while rollers 189 of articles orienting section 120 are spaced slightly therebelow. Belts 230 are powered for movement whereby their upper reaches may be moved to the right in FIG. 5.

Pivotally connected to the forward end of the magazine frame is an elongate fence 234. Fence 234 is swingable about a substantially horizontal pivot axis, provided by pivot shaft 236 to which the fence is secured, between a stop position, indicated in solid outline in FIG. 5, in which it prevents articles from moving beyond rollers 189 and into the magazine and a raised position, illustrated in dot-dash outline at 234A, in which articles may move through the forward end of the magazine onto belts 230. An extensible contractible ram 240 is operatively connected to fence 234 for swinging the same between its stop and open positions, respectively. An elongate lever arm 242 is secured to shaft 236 adjacent the end of the fence farthest from the viewer in FIG. 5. An elongate, upright rod 244 is connected at its upper end to lever arm 242. An elongate, substantially horizontal support frame 250 is pivotally connected adjacent one of its ends at 252 to the lower end of rod 244 and adjacent its opposite end at pivot point 254 to the downstream end of the support frame for rollers 174, 182.

A pair of upright pulley supports, such as that indicated generally at 256 are mounted on support frame 250 intermediate rollers 182 and fence 234 and between laterally spaced pairs of adjacent rollers 189. Pulley support 256 supports a pair of upright pulleys 260, 262 adjacent its upper end and a pulley 264 adjacent its lower end. An elongate, endless, flexible friction belt 266 is trained over pulleys 260, 262, 264, respectively, on each of the pulley supports. These pulleys and belts are driven through a drive chain, indicated generally in dashed outline at 268 which also is connected to the power drive for rollers 174 on the outfeed conveyor section.

The mounting of pulley supports 256 on support frame 250 is such that when fence 234 is in its lowered, stop, position, as shown in solid outline, belts 266 are disposed below the upper surfaces of rollers 189. With swinging of fence 234 to its raised, or open, position as shown at 234A, belts 266 are raised to the position shown in dot-dash outline with belts 266 above rollers 189, thus to carry a pallet from the downstream end of outfeed conveyor section 16 into magazine 18. After the forward end of a pallet has been received on belts 230 powered movement of the upper reaches 230a of belts 230 pulls the pallet fully into the magazine.

Disposed between spaced belts 230 are a pair of parallel, elongate, horizontal lifting bars 280. Each of these bars is connected to a vertical lifting rod, such as that illustrated at 282, which is shiftable vertically through a guide sleeve 284. An extensible-contractible ram 286 is connected, through a bell crank 288, to the lower end of each of rods 288 in such a manner that with ram 286 contracted, as illustrated in FIG. 5, bars 280 are below reaches 230a of the belts and upon extension of ram 286 bars 280 are raised above reaches 230a of the belts.

Supported on beams 220, 222 are a plurality of pallet holdings dogs 290 having the general configuration illustrated in FIG. 6. Each of the dogs is mounted between a pair of upstanding supports 292 and is freely swingable on a shaft 294 extending between supports 292.

Each dog 290 has a sloping surface 290a which slopes inwardly toward the center of the magazine on progressing upwardly. A substantially horizontal support surface 290b extends inwardly on the dog toward the center of the magazine from pivot shaft 294.

On lifting of a pallet, by raising bars 280, opposite edge portions of the pallet 56 contact the inclined, inwardly facing surfaces 290a of opposed dogs 290 and swing them outwardly whereby the pallet may move upwardly past the dogs. As the pallet moves above the dogs, the dogs swing back in and under the pallet with their support surfaces 290b under the edges of the pallet. Subsequent lowering of bars 290 causes the pallet to come to rest on support surfaces 290b of the dogs, as illustrated in phantom outline at 56A for a pallet in FIG. 6.

Describing operation of the pallet storage magazine and means for diverting pallets thereto, when a pallet is conveyed toward the magazine on outfeed conveyor section 16, ram 240 is extended to raise fence 234 to its open position and to raise belts 266 above the level of rollers 189. A pallet conveyed off of the downstream ends of the rollers of section 16 are carried by belts 266 into the pallet magazine and onto belts 230. Thereafter, the pallet is raised by bars 280 to be supported on dogs 290. Thereafter, fence 234 and belts 266 are lowered to prevent other articles, such as cartons, from moving into the magazine. The pallet storage magazine thus is operable to accept pallets for storage and stack them in an accumulated stack after which they may be removed by a lift truck or other carrying means.

Conventional forms of sensing and control mechanism are connected to operating components in the apparatus to produce the desired sequence of operation as outlined above. Thus, the apparatus is operable to receive a palletized stack of articles as indicated at 54, and convey them along infeed conveyor section 12 into tilt frame depalletizer section 14, with the pallet and load supported on the rollers of the bottom support of the depalletizer and an upright side of the load contiguous and facing support plate 120 of the side support 70. Control rollers 106, 108 are depressed by the load and, as has been described, act first to slow rollers 90 and then to stop the rollers, thus to stop the load in position as shown in FIGS. 2, 3 and 4.

With the load thus positioned in the depalletizing section, top support 72 is moved downwardly along side support 70 to clamp against the top of the load as illustrated at 72B in FIG. 2 and in solid outline in FIG. 8.

The bottom support 68, side support 70 and top support 72 are swung concurrently in a clockwise direction as viewed in FIG. 2 about shaft 46 to the laid-over positions shown in phantom outline in FIG. 2. This lays the load over on its side, with the load then being supported on side support 70.

Figure 10:
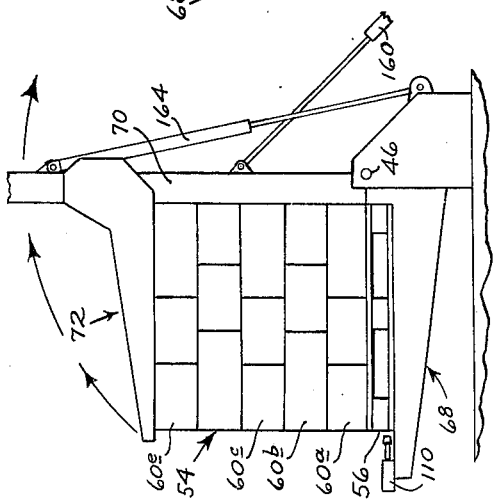

Bottom support 68 then is returned to its first, substantially horizontal position, as shown in solid outline in FIGS. 2 and 10, to swing pallet 56 to a horizontal position, while remainder portions of the load are retained supported on side support 70. When bottom support 68 is returned to its substantially horizontal position, rollers 90 come into contact with drive belt 94, which then is operable to drive the rollers to carry the pallet in a downstream direction in the apparatus onto outfeed conveyor 16.

As the pallet is conveyed toward the downstream end of outfeed conveyor 16 ram 240 (see FIG. 5) on the pallet storage magazine is extended to raise fence 234 and diverting belts 266. The pallet is carried from the downstream end of outfeed conveyor 16 across belts 266 and onto belts 230 in magazine 18. Extension of ram 286 in the magazine raises bars 280 under the pallet, lifting the same upwardly into a supported position on lugs 290. After the pallet has been passed into the magazine, ram 240 is contracted to lower fence 234 and diverting belts 266.

After pallet 56 is conveyed away from bottom section 68 of the depalletizer, the bottom support is swung again to an upright position, as seen in FIG. 11, and top support 72 is moved under power along side support in the direction of bottom support 68 to slide the bottom layer 60a of the load against the bottom support 68. Bottom support 68 then is swung independently of side support 70 and top support 72 to the horizontal position shown in FIG. 13 to lower layer 60a to a horizontal position, with remainder layers in the stack still supported on side support 70. Rollers 90 coming into contact with belt 94 once again serves to operate the rollers to convey this layer of cartons in a downstream direction along the apparatus onto outfeed conveyor 16.

Referring to FIG. 7, as the removed layer reaches the downstream end of outfeed conveyor 16, rollers 174 are stopped with the cartons farthest downstream in the layer partially overlying rollers 182. Rollers 182 then may be operated at a faster speed than rollers 174 to move this first layer onto rollers 189. Fence 234 on the storage magazine in its lowered position prevents the cartons from moving beyond rollers 189.

Rollers 189, 190 are operated to carry the row of cartons removed from the layer to the right in FIG. 7. As a carton which is oriented with its lengthwise direction extending transversely of the path along which cartons are moved by rollers 190 arrives adjacent the turning device belt reach 210a which is traveling faster than the article itself engages an upright side of the article and serves to turn it 90° to a position in which its lengthwise direction extends longitudinally of the path for the articles. Thus, the articles from a layer in which various articles are disposed at 90° to each other are formed into an elongate row in which all of the articles are oriented in a common direction.

After bottom layer 60a has been conveyed away from depalletizer section 14, the steps illustrated in FIGS. 11 through 13 are repeated until all of the layers have been removed from side support 70.

The apparatus thus is operable to receive a stack of articles in vertically disposed, substantially horizontal layers, and remove layers successively from the stack. After an individual layer has been removed from the stack, the apparatus further is operable to break the layer into an elongate row and produce reorientation of articles taken from the layer to place them all in an elongate row with a preselected common orientation in the row.

While an embodiment of the invention has been described herein, it should be apparent to those skilled in the art that variations and modifications are possible without departing from the spirit of the invention.

It is claimed and desired to secure by Letters Patent:

1. Apparatus for receiving a stack of articles disposed in a plurality of vertically stacked, substantially horizontal layers and successively removing layers from said stack, said apparatus comprising
    bottom support means operable, in a substantially horizontally disposed first position, to receive and support the underside of a stack of articles,
    side support means adjacent one side of said bottom support means having a stack-supporting side operable, in a substantially upright first position, to support an upright side of a stack of articles on said bottom support means,
    means pivotally mounting said side support means for swinging about a substantially horizontal pivot axis between its first position and a second, substantially laid-over, position with said stack-supporting surface facing upwardly,
    stop means for limiting swinging of said support means whereby when in its second position its stack supporting side is horizontal,
    means pivotally mounting said bottom support means for swinging in the direction of said side support means about a substantially horizontal pivot axis between its first position and a second, substantially upright, position,
    first powered means for swinging said side support means and bottom support means concurrently from their first to their second positions to lay a stack of articles held by said side and bottom support means over onto its side, and
    second powered means for swinging said bottom support means from its second to its first positions independently of said side support means to swing the bottom layer of said stack from an upright position to a horizontal position, while remainder layers of said stack remain in their laid-over positions on said side support means.

2. The apparatus of claim 1, wherein said second powered means is operable to swing said bottom support means from its first to its second position following removal of a layer therefrom, and which further comprises means for sliding the rermainder of said laid-over stack on said side support toward said bottom support means.

3. The apparatus of claim 1, wherein said first powered means comprises an extensible-contractible ram operatively connected at one of its ends to said side support means.

4. The apparatus of claim 1, wherein said second powered means comprises an elongate, extensible-contractible ram operatively interconnecting said bottom support means and side support means for swinging said bottom support means relative to said side support means.

5. The apparatus of claim 1, wherein said bottom support means comprises a support frame which projects substantially normally outwardly from said stack supporting side of the side support means when both are in their first positions and an article-engaging member projecting upwardly from said frame a distance less than the height of a layer in the stack adjacent and paralleling said stack supporting side of the side support means.

6. The apparatus of claim 1, which further comprises article-engaging means secured to an edge margin of said bottom support means adjacent said side supprt means and projecting substantially normally outwardly from said bottom support means in the direction of said side support means a distance less than the height of a layer to be removed from a stack.

7. The apparatus of claim 6, which further comprises means on said bottom support means operable to grip a layer of a stack to aid in removing such a layer from the stack and lowering it from an upright to a substantially horizontal position.

8. The apparatus of claim 1, which further comprises top support means mounted on an projecting outwardly at a substantial angle from said side support means, said top support means being mounted for swinging with said side support means between a first position overlying said bottom support means when said bottom support means and side support means are in their first positions, and a second position projecting upwardly from said side support means when the side support means is in its second position.

9. The apparatus of claim 8, wherein said top support means is movably mounted on said side support means for movement therealong in the direction of said bottom support means to clamp against the top of a stack of articles held on said bottom support means.

10. The apparatus of claim 8, wherein said top support means comprises an elongate element cantilevered outwardly from said side support means and mounted for movement along said side support means toward and away from said bottom support means, and powered means operatively connected to said top support element operable to shift the same toward and away from said bottom support means under power.

11. Apparatus for receiving a stack of articles disposed in a plurality of vertically stacked, substantially horizontal layers anad successively removing layers from said stack, said apparatus comprising bottom support means operable, in a substantially horizontally disposed first position, to receive and support the underside of a stack of articles, side support means adjacent one side of said bottom support means having a stack-supporting side operable, in a substantially upright first position, to support an upright side of a stack of articles on said bottom support means, elongate top support means cantilevered outwardly from said side support means, extending substantially normal thereto and overlying said bottom support means when said side support means is in its first position with the end of said top support means spaced outwardly from the side support means being spaced from the bottom support means providing on opening between said top support means and bottom support means in a region opposite said side support means, means mounting said top support means for movement longitudinally of the side support means toward and away from said bottom support, means pivotally mounting said side support means for swinging about a substantially horizontal pivot axis between its first positon and a second, substantially horizontal laid-over, position with said stack-supporting surface facing upwardly and said top support means extending substantially vertically upwardly therefrom, means pivotally mounting said bottom support means for swinging in the direction of said side support means about a substantially horizontal pivot axis between its first position and a second, substantially upright, position, first powered means for swinging said side support means, top support means, and bottom support means concurrently from their first to their second positions to lay a stack of articles held by said side and bottom support means over onto its side, and second powered means for swinging said bottom support means from its second to its first positions independently of said side support means to swing the bottom layer of said stack from an upright position to a horizontal position, while remainder layers of said stack remain in their laid-over positions on said side support means.

12. The apparatus of claim 11 which further comprises third powered means operatively connected to said top support means for moving the same along said side support means toward and away from said bottom support means.

13. The apparatus of claim 11 wherein said means mounting said top support means on said side support means comprises an elongate guide extending longitudinally of said side support means and roller means operatively supporting said top support means on said guide for movement therealong.

14. Apparatus for receiving a stack of articles disposed in a plurality of vertically stacked, substantially horizontal layers and successively removing layers from said stack, said apparatus comprising bottom support means operable, in a substantially horizontally disposed first position, to receive and support the underside of a stack of articles, side support means adjacent one side of said bottom support means having a stack-supporting side operable, in a substantially upright first position, to support an upright side of a stack of articles on said bottom support means, an article engaging member secured to and projecting substantially normally upwardly from a side portion of said bottom support means adjacent said side support means, said article engaging member projecting upwardly from said bottom support means a distance less than the height of a layer in the stack and defining with said side support means a substantially continuous support for a side of a stack of articles from said bottom support means to the top of said stack when said bottom and side support means are in their said first positions, means pivotally mounting said side support means for swinging about a substantially horizontal pivot axis between its first position and a second, substantially laid-over, position with said stack-supporting surface facing upwardly, means pivotally mounting said bottom support means for swinging in the direction of said side support means about a substantially horizontal pivot axis between its first position and a second, substantially upright, position, first powered means for swinging said side support means and bottom support means concurrently from their first to their second positions to lay a stack of articles held by said side and bottom support means over onto its side, and second powered means for swinging said bottom support means and the article engaging member secured thereto from their second to their first positions independently of said side support means to swing the bottom layer of said stack from an upright position to a horizontal position, while remainder layers of said stack remain in their laid-over positions on said side support means.

15. The apparatus of claim 14 which further comprises article gripping means mounted on said bottom support means opposite and facing said article engaging member and powered means for shifting said article gripping means toward and away from said article engaging member to grip articles therebetween.

16. The apparatus of claim 15 wherein said gripping means comprises a plurality of gripping heads mounted on extendible contractible rams directed toward said article engaging member.

* * * * *